(No Model.) 2 Sheets—Sheet 1.
J. T. STEWART.
DECORTICATING MACHINE.
No. 428,257. Patented May 20, 1890.
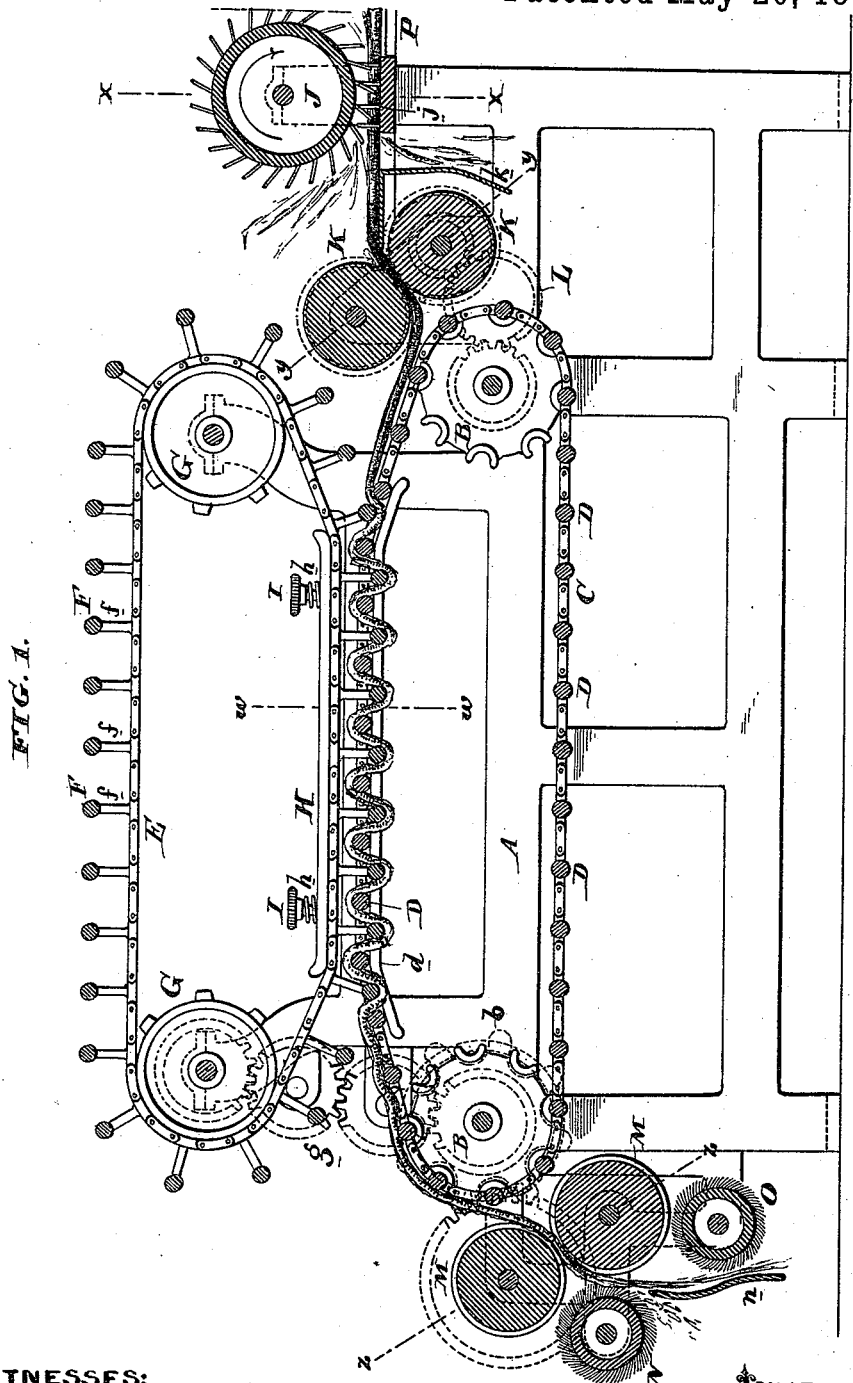
WITNESSES:
INVENTOR:

(No Model.) 2 Sheets—Sheet 2.
J. T. STEWART.
DECORTICATING MACHINE.
No. 428,257. Patented May 20, 1890.
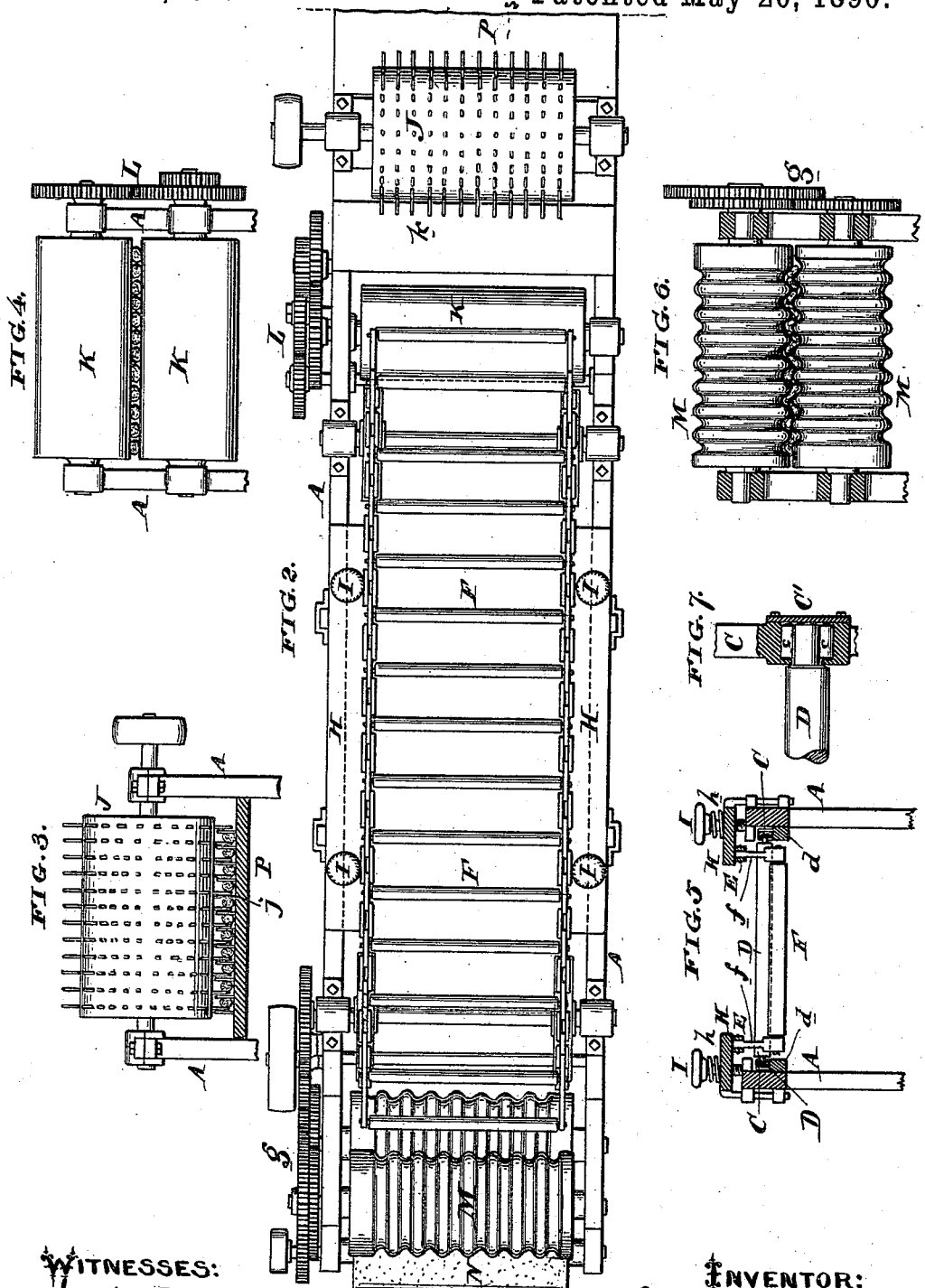

UNITED STATES PATENT OFFICE.

JAMES T. STEWART, OF PHILADELPHIA, PENNSYLVANIA.

DECORTICATING-MACHINE.

SPECIFICATION forming part of Letters Patent No. 428,257, dated May 20, 1890.

Application filed October 15, 1889. Serial No. 327,114. (No model.)

*To all whom it may concern:*

Be it known that I, JAMES T. STEWART, of the city and county of Philadelphia, and State of Pennsylvania, have invented an Improvement in Decorticating-Machines, of which the following is a specification.

My invention has reference to decorticating-machines for the treatment of ramie, jute, and other fibrous plants; and it consists of certain improvements, all of which are fully set forth in the following specification, and shown in the accompanying drawings, which form a part thereof.

The object of my invention is to treat the stalks of ramie and similar fibrous plants in a manner which shall be continuous and break the woody interior without the least injury to the fibrous coating or bark beyond the splitting of it longitudinally and putting it in condition for the ready liberation of the said woody interior.

In the process of treating the fibrous plants my invention contemplates the removal of the leaves and the subsequent separation of the woody interior from the fibrous bark.

In carrying out my invention I have had in view the avoidance of the employment of the usual forms of corrugated or grooved rolls, which have heretofore been commonly used in the treatment of ramie and similar plants. The objection to the employment of grooved rollers has been found to be very great, owing to the tendency to cut the fiber transversely and also gum up the machine, so as to render it inoperative; hence but little or no success has been heretofore obtained by their employment.

In carrying out my invention I provide a suitable device for stripping the plant of its leaves as it is delivered to a pair of squeeze-rolls, whose object is to more or less split the bark longitudinally, and over these squeeze-rolls it is delivered upon an endless carrier or conveyer composed of chains having cross-bars. Working in conjunction with the said conveyer is a second conveyer, which is also provided with a set of cross-bars, which are so placed as to pass down between the cross-bars of the first-mentioned conveyer, the said conveyers being geared together in such a manner that the cross-bars move in exact unison or synchro-
nism. The ramie is bent over the first-mentioned bars and under the second-mentioned bars as they pass in close juxtaposition in conveying the ramie through the machine. The ramie is thus bent backward and forward, causing its woody interior to be broken in numerous places without severing the fibrous bark transversely to its length. After the ramie has been treated in the above manner it is subjected to further action, and to this end is delivered to a second set of rolls, preferably provided with grooves encircling them, which rolls act as delivering-rolls, and also insure the longitudinal splitting of the fiber without injury to the length thereof, and, finally, the ramie is subjected to the action of a rapidly-revolving brush, which brushes out the woody substance separating it from the fibrous coating, which latter is also preferably subjected to the action of a brush and then delivered for further treatment, such as the degumming and bleaching processes.

In the drawings, Figure 1 is a sectional elevation of my improved decorticating-machine, taken on line $s\,s$ of Fig. 2. Fig. 2 is a plan view of my improved decorticating-machine. Fig. 3 is a sectional elevation on line $x\,x$ of Fig. 1, but showing the stripping-cylinder in elevation. Fig. 4 is a detail view of the machine looking toward the crushing-rolls arranged in line $y\,y$. Fig. 5 is a cross-section of a portion of my improved machine on line $w\,w$, Fig. 1. Fig. 6 is a cross-section of same on line $z\,z$, Fig. 1, and with the rolls and their operating-gears in elevation; and Fig. 7 is a sectional elevation through one of the roller-bearings for one of the transverse bars.

A is the main frame of the machine.

B B are sprocket-wheels arranged at a distance apart and over which the two chains C C (see Fig. 5) pass. These chains are connected at intervals, preferably equal, by cross-bars D, forming them into a kind of endless-ladder conveyer. These cross-bars D are preferably round and free to rotate. Arranged above the said sprocket-wheels B B are located sprocket-wheels G G, about which pass two endless chains E E, (see Fig. 5,) part of whose lengths are provided with arms $f$, to the ends of which are journaled cross-bars F, preferably of shorter lengths than the cross-bars D, and at equal intervals apart, as illustrated in Fig. 5, as the said bars or rollers F and their bearings are designed to pass through the spaces bounded by the chains C C. The chains C and E are drawn toward each other, as indicated in Fig. 1, the chains C passing above guideways $d$ and the chains E passing under guides H, which are pressed downward by means of the springs $h$, which may be adjusted by adjusting-screws I. By means of the screws I the chains E and C may be made to project closer toward or farther from each other, and thus control the distance to which the bars F pass between the bars D. The springs $h$ allow a certain amount of movement to the guide H to relieve any excessive strain upon the cross-bars D and F and to permit them to travel more nearly in line while the strain continues. By means of the guides $d$ and H the chains approach each other at one end on an angle and recede from each other at the other end on an angle, forming a ready entrance and delivery for the ramie. The sprocket-wheels G are geared to the sprocket-wheels B by intermediate gearing $g$, so as to insure the speed of travel of the bars F, being exactly in accordance with the speed of travel of the bars D, whereby they shall travel at all times with reference to each other as indicated in Fig. 1.

To enable the cross-bars D to freely rotate, they may be supported in roller-bearings $c$, as shown in Fig. 7, and access can be had to said bearings by means of the removable plates C'. It is evident that any form of anti-friction bearing may be employed for this purpose, and also that such anti-friction bearings may be also used upon the bars F where they are journaled to the arms $f$.

The feeding end of the machine is provided with a table P, upon which are arranged upright pins or projections $j$, and above which is located a stripping-cylinder J, having projecting pins arranged upon its periphery, as shown in Figs. 1, 2, and 3, acting in connection with said stationary pins on the table P, so that the ramie or other plant to be decorticated in passing over the table and between the pins $j$ thereof shall have all the leaves of such plant stripped from the body portion and discharged, said leaves falling down in front of the apron $k$. The ramie or other plant so treated is then fed between the crushing-rolls K K, which are preferably made smooth or cylindrical and are geared together and with the sprocket-wheel B by means of the gearing L. At the discharge end of the machine the ramie or other plant, after leaving the endless conveying devices, passes down between two delivering and crushing rolls M M, which are driven at the proper speed by the gearing $g$. These rolls M M are preferably provided with circumferential grooves, as shown in Fig. 6, the object of which is to insure the more ready splitting of the fibrous bark to allow the free escape of the interior woody substance in case the said bark has not become split to the requisite degree by the previous treatment. As soon as the plant passes between the rolls M M the loosened woody interior is brushed off by the revolving brush N, and the fibrous bark is conducted back of the guide $n$ and subjected to treatment by the brush O.

By this apparatus the bark is first crushed sufficiently to split it longitudinally upon its sides and render it in condition to be readily broken or bent over the transverse bars D by the transverse bars F, and the degree to which this breaking action is carried may be regulated to a nicety by the adjusting-screws I I. In a machine of this character there is no tendency to the gumming up of the machine, and the entire breaking apparatus is exposed to view from all sides and can be readily kept clean.

The sprocket-wheels B at the discharge end may be provided with transverse portions or bars $b$, which, during the rotation of the chain C about the said wheel, pass upward between the transverse bars or rollers D, as shown in dotted lines in Fig. 1, and may thus be employed to push the ramie upward, bringing it between said transverse bars D, and thus liberate it from the chain. It is evident that a series of pairs of these endless chains and transverse bars or rollers may be employed and arranged end to end, so that after the ramie or other plant has been broken in one machine it may pass to the next machine, and so on, and by arranging the transverse bars D and F respectively at different distances apart in their respective chains, each succeeding set of chains and bars may be caused to break the ramie or other plant in different places, and thus insure, by a successive treatment, the most minute breaking of the woody substance without the least injury to the fibrous coatings or bark.

I do not limit myself to the mere details of construction, because they may be modified without in the least departing from the spirit of the invention.

Having thus described my invention, what I claim as new, and desire to secure by Letters Patent, is—

1. In a decorticating-machine, two endless chain or conveying devices, each of which is provided with a series of transverse bars arranged at equal distances apart, in combination with means to rotate the said endless chain or conveying devices at equal speeds, and guides independent of the rotating devices to cause the said transverse bars of the respective chains to travel in close juxtaposition for a portion of their entire travel, with the transverse bars of the one conveyer or chain projecting a distance beyond those of the other.

2. In a decorticating-machine, two endless chain or conveying devices, each of which is provided with a series of transverse bars arranged at equal distances apart, in combination with means to rotate said endless chain or conveying devices at equal speeds, guides independent of the rotating devices to cause the said transverse bars of the respective chains to travel in close juxtaposition for a portion of their entire travel, with the transverse bars of the one conveyer or chain projecting a distance beyond those of the other, and feeding-rolls for feeding the ramie or other plant between these transverse bars of the respective chains at one end.

3. In a decorticating-machine, two endless chain or conveying devices, each of which is provided with a series of transverse bars arranged at equal distances apart, in combination with means to rotate said endless chain or conveying devices at equal speeds, guides independent of the rotating devices to cause the said transverse bars of the respective chains to travel in close juxtaposition for a portion of their entire travel, with the transverse bars of the one conveyer or chain projecting a distance beyond those of the other, feeding-rolls for feeding the ramie or other plant between the transverse bars of the respective chains at each end, a delivering-roll for delivering the treated ramie or other plant from the discharge ends of the endless chain or conveying devices, and a brush to separate the fibrous bark or covering of the ramie or other plant.

4. The combination of two endless chains or conveyers, each provided with a series of transverse bars, the bars of one of the conveyers projecting a distance beyond the plane of the chain or conveyer, devices to actuate said chains or conveyers at equal speeds, and guides to cause said chains or conveyers to approach each other during a portion of their movement, so that the projecting bars of the one conveyer pass between the bars of the other.

5. The combination of two endless chain or conveying devices, each of which is provided with a series of transverse bars arranged at equal distances apart and adapted to project across the line of travel of the bars of the opposite chain or conveying device during a portion of their travel, means to guide and rotate said chain or conveying devices, so as to make their transverse bars travel at equal speeds, and guides independent of the rotating devices to cause the chain or conveying devices to approach each other for a portion of their travel and so as to form an opening at the delivery and discharge ends between the transverse bars of the respective chain or conveying devices.

6. The combination of two endless chain or conveying devices, each of which is provided with a series of transverse bars arranged at equal distances apart and adapted to project across the line of travel of the bars of the opposite chain or conveying device during a portion of their travel, means to guide and rotate said chain or conveying devices, so as to make their transverse bars travel at equal speeds, adjustable guides to cause the chain or conveying devices to approach each other for a portion of their travel and so as to form an opening at the delivery and discharge ends between the transverse bars of the respective chain or conveying devices, and devices for adjusting said adjustable guides.

7. The combination of two endless chain or conveying devices, each of which is provided with a series of transverse bars arranged at equal distances apart and adapted to project across the line of travel of the bars of the opposite chain or conveying device during a portion of their travel, means to guide and rotate said chain or conveying devices, so as to make their transverse bars travel at equal speeds, adjustable spring-retained guides to cause the chain or conveying devices to approach each other for a portion of their travel, so as to form openings at the delivery and discharge ends between the transverse bars of the respective chain or conveying devices, and devices for adjusting said spring-retained guides.

8. The combination of two endless chain or conveying devices, each of which is provided with a series of transverse bars arranged at equal distances apart and adapted to project across the line of travel of the bars of the opposite chain or conveying device during a portion of their travel, means to guide and rotate said chain or conveying devices, so as to make their transverse bars travel at equal speeds, guides to cause the chain or conveying devices to approach each other for a portion of their travel, so as to form openings at the delivery and discharge ends between the transverse bars of the respective chain or conveying devices, delivering-rolls for delivering the treated ramie or other plant from the delivery end of the said chain or conveying devices, and a revolving brush or separating device for removing the woody material from the fibrous coating or bark.

9. The combination of two endless chain or conveying devices, each of which is provided with a series of transverse bars arranged at equal distances apart and adapted to project across the line of travel of the bars of the opposite chain or conveying device during a portion of their travel, means to guide and rotate said chain or conveying devices, so as to make their transverse bars travel at equal speeds, guides to cause the chain or conveying devices to approach each other for a portion of their travel, so as to form openings at the delivery and discharge ends between the transverse bars of the respective chain or conveying devices, a stripping-wheel having projections for removing the leaves from the ramie or other plant, a stationary table provided with projections for use in connection with the stripping-wheel, feed-rolls for crushing the ramie and delivering it between the feeding ends of the two chain or conveying devices, delivering-rolls for delivering the treated ramie or other plant from the delivery end of said chain or conveying devices, and a revolving brush or separating device for removing the woody material from the fibrous coating or bark.

10. The combination of wheels G G, two endless chains E E, having arms $f$ and connected by cross-bars F, two sprocket-wheels B B, two endless chains C C, arranged to travel about the wheels B B and provided with cross-bars D, gearing to cause the chains E and C, with their cross-bars, to travel in the same direction where said chains come adjacent to each other, and guides $d$ and H, for holding and guiding the chains C and E close to each other during a portion of their travel, so as to insure the cross-bars F passing between the cross-bars D.

11. The combination of wheels G G, two endless chains E E, having arms $f$, and connected by cross-bars F, two sprocket-wheels B B, two endless chains C C, arranged to travel about the wheels B B and provided with cross-bars D, anti-friction bearings for said cross-bars D at their points of connection with the chains C, and power-transmitting mechanism for rotating the wheels G G and B B.

12. The combination of wheels G G, two endless chains E E, having arms $f$ and connected by cross-bars F, two sprocket-wheels B B, two endless chains C C, arranged to travel about the wheels B B and provided with cross-bars D, gearing to cause the chains E and C, with their cross-bars, to travel in the same direction where said chains come adjacent to each other, guides $d$ and H, for holding and guiding the chains C and E close to each other during a portion of their travel, so as to insure the cross-bars F passing between the cross-bars D, and adjusting devices to relatively adjust the guides $d$ and H nearer together or farther apart.

13. The combination of wheels G G, two endless chains E E, having arms $f$ and connected by cross-bars F, two sprocket-wheels B B, two endless chains C C, arranged to travel about the wheels B B and provided with cross-bars D, gearing to cause the chains E and C, with their cross-bars, to travel in the same direction where said chains come adjacent to each other, guides $d$ and H, for holding and guiding the chains C and E close to each other during a portion of their travel, so as to insure the cross-bars F passing between the cross-bars D, and spring-supports for one of said guides, whereby any excessive strains may be relieved and the cross-bars D and F be permitted to become more nearly in line during the continuation of the strain.

14. In a decorticating-machine, the combination, with strippers for the leaves of the stalks, of suitable breaking devices to break the woody interior and crushing-rollers arranged adjacent thereto to crush the leafless stalks longitudinally before they are fed to the breaking devices.

15. The combination of two endless conveying chains or devices having transverse bars adapted to mesh with each other, substantially as set forth, and guide rollers or wheels for said chains, the said guide rollers or wheels at the discharge end of the lower endless conveyer being provided with transverse portions adapted to pass upward between the transverse bars to the said endless conveyer to push the ramie upward and liberate it.

In testimony of which invention I hereunto set my hand.

JAMES T. STEWART.

Witnesses:
ERNEST HOWARD HUNTER,
S. T. YERKES.